United States Patent
Furuhata

(10) Patent No.: US 9,857,174 B2
(45) Date of Patent: *Jan. 2, 2018

(54) GYRO SENSOR WITH SPRING STRUCTURES TO SUPPRESS INFLUENCE OF THE SAME PHASE MODE ON A VIBRATION MODE

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 139 days.

This patent is subject to a terminal disclaimer.

(21) Appl. No.: 14/189,118

(22) Filed: Feb. 25, 2014

(65) Prior Publication Data

US 2014/0245831 A1    Sep. 4, 2014

(30) Foreign Application Priority Data

Mar. 4, 2013 (JP) .................................. 2013-042165

(51) Int. Cl.
*G01C 19/574* (2012.01)

(52) U.S. Cl.
CPC .................................. *G01C 19/574* (2013.01)

(58) Field of Classification Search
CPC ............. G01C 19/574; G01C 19/5747; G01C 19/5719; G01C 19/5733; B81B 2201/0242
USPC ......................................... 73/504.12–504.16
See application file for complete search history.

(56) References Cited

U.S. PATENT DOCUMENTS

| | | | |
|---|---|---|---|
| 5,895,850 | A | 4/1999 | Buestgens |
| 6,214,243 | B1 | 4/2001 | Muenzel et al. |
| 6,705,164 | B2 | 3/2004 | Willig et al. |
| 6,752,017 | B2 | 6/2004 | Willig et al. |

(Continued)

FOREIGN PATENT DOCUMENTS

| | | |
|---|---|---|
| DE | 102011006453 A1 | 10/2012 |
| JP | 11-513844 A | 11/1999 |

(Continued)

OTHER PUBLICATIONS

Rebeiz, RF MEMS Theory, Design, and Technology, 2003, 2.1 Spring Constant of fixed-fixed beams.*

(Continued)

*Primary Examiner* — Peter Macchiarolo
*Assistant Examiner* — David L Singer
(74) *Attorney, Agent, or Firm* — Harness, Dickey & Pierce, P.L.C.

(57) ABSTRACT

A gyro sensor capable of suppressing influence of the same phase mode on a vibration mode includes a vibrating body, a first spring structure portion that extends in a direction along a first axis and is connected to the vibrating body, first and second vibrating portions that are disposed in parallel to each other in the direction along the first axis and are excited and vibrated in an opposite phase to each other, and a second spring structure portion that extends in the direction along the first axis and is connected to the first and second vibrating portions, in which a first spring constant K1 of the first spring structure portion is smaller than a second spring constant K2 from a middle point at which a length between both ends of the second spring structure portion is equally divided into two to one end of the second spring structure portion.

6 Claims, 14 Drawing Sheets

(56) References Cited

U.S. PATENT DOCUMENTS

| | | |
|---|---|---|
| 6,766,689 B2 | 7/2004 | Spinola Durante et al. |
| 6,928,872 B2 | 8/2005 | Durante et al. |
| 8,210,038 B2 | 7/2012 | Rocznik |
| 8,302,476 B2 | 11/2012 | Matsumoto et al. |
| 8,365,595 B2 | 2/2013 | Geiger et al. |
| 9,182,421 B2* | 11/2015 | Jeong ............... G01C 19/574 |
| 2002/0165667 A1 | 11/2002 | Lee |
| 2003/0066350 A1* | 4/2003 | Machida ......... G01C 19/5607 |
| | | 73/504.15 |
| 2003/0154788 A1 | 8/2003 | Willig et al. |
| 2003/0164040 A1* | 9/2003 | Willig ............. G01C 19/5747 |
| | | 73/504.02 |
| 2003/0183007 A1 | 10/2003 | Willig et al. |
| 2004/0123660 A1* | 7/2004 | Willig ............. G01C 19/5747 |
| | | 73/504.12 |
| 2005/0066728 A1* | 3/2005 | Chojnacki ........ G01C 19/5719 |
| | | 73/514.16 |
| 2006/0117852 A1* | 6/2006 | Park ................ G01P 15/0888 |
| | | 73/504.16 |
| 2007/0234803 A1 | 10/2007 | Gomez et al. |
| 2008/0276706 A1* | 11/2008 | Hartmann ........ G01C 19/5747 |
| | | 73/504.04 |
| 2008/0282833 A1* | 11/2008 | Chaumet .......... G01C 19/5747 |
| | | 74/5 R |
| 2008/0293311 A1 | 11/2008 | Miguchi |
| 2009/0193892 A1* | 8/2009 | Seeger ............. G01C 19/5719 |
| | | 73/504.12 |
| 2010/0000321 A1* | 1/2010 | Neul ............... G01C 19/5762 |
| | | 73/504.12 |
| 2010/0037690 A1* | 2/2010 | Gunthner ......... G01C 19/5712 |
| | | 73/504.04 |
| 2010/0122577 A1* | 5/2010 | Neul ................... G01C 19/574 |
| | | 73/504.12 |
| 2010/0225500 A1* | 9/2010 | Ulm ................. B60R 21/0132 |
| | | 340/440 |
| 2011/0132087 A1* | 6/2011 | Ohms .............. G01C 19/5747 |
| | | 73/504.12 |
| 2011/0185813 A1 | 8/2011 | Classen et al. |
| 2012/0060604 A1 | 3/2012 | Neul et al. |
| 2012/0176128 A1* | 7/2012 | Seeger ............. G01R 33/0286 |
| | | 324/244 |
| 2012/0176129 A1* | 7/2012 | Seeger ............. G01R 33/0286 |
| | | 324/252 |
| 2012/0222483 A1* | 9/2012 | Blomqvist ........ G01C 19/5719 |
| | | 73/504.12 |
| 2012/0260737 A1* | 10/2012 | Chaumet ............. G01C 19/574 |
| | | 73/658 |
| 2013/0098152 A1 | 4/2013 | Jeong et al. |
| 2013/0111991 A1 | 5/2013 | Takizawa |
| 2013/0160545 A1 | 6/2013 | Rocchi et al. |
| 2013/0255377 A1 | 10/2013 | Furuhata et al. |
| 2013/0270659 A1 | 10/2013 | Jomori et al. |
| 2013/0283909 A1 | 10/2013 | Furuhata |
| 2013/0298673 A1 | 11/2013 | Takizawa |
| 2013/0320803 A1 | 12/2013 | Maeda |
| 2014/0116134 A1 | 5/2014 | Classen et al. |
| 2014/0326070 A1 | 11/2014 | Neul et al. |
| 2015/0276408 A1 | 10/2015 | Neul et al. |
| 2016/0109236 A1 | 4/2016 | Neul et al. |

FOREIGN PATENT DOCUMENTS

| | | |
|---|---|---|
| JP | 2006-119001 A | 5/2006 |
| JP | 2006-515928 A | 6/2006 |
| JP | 4047377 B2 | 2/2008 |
| JP | 2008-224229 A | 9/2008 |
| JP | 2010-531447 A | 9/2010 |
| JP | 2011-504585 A | 2/2011 |
| JP | 2012-518184 A | 8/2012 |
| JP | 2013-210283 A | 10/2013 |
| JP | 2013-217666 A | 10/2013 |
| WO | WO-2008-032415 A1 | 3/2008 |
| WO | WO-2009-003543 A1 | 1/2009 |
| WO | WO-2010-076059 A1 | 7/2010 |
| WO | WO-2010-096306 A1 | 8/2010 |

OTHER PUBLICATIONS

Prof. Nguyen, EE 245: Introduction to MEMS Module 8: Microstructural Elements, Oct. 12, 2010.*

Wai-Chi et. al, Formulation of Stiffness Constant and Effective Mass for a Folded Beam, 2010, Arch. Mech., 62, 5, pp. 405-418, Warszawa 2010.*

U.S. Appl. No. 13/855,152, filed Apr. 2, 2013, Makoto Furuhata.

Barton, Elements of Green's Functions and Propagation Potentials, Diffusion and Waves, 1999 Oxford University Press, reprint with corrections of 1989 publication, 371-372.

* cited by examiner

200

GYRO SENSOR WITH SPRING STRUCTURES TO SUPPRESS INFLUENCE OF THE SAME PHASE MODE ON A VIBRATION MODE

BACKGROUND

1. Technical Field

The present invention relates to a gyro sensor, an electronic apparatus, and a moving object.

2. Related Art

In recent years, a gyro sensor (capacitance type MEMS gyro sensor element), which detects angular velocity, for example, by using a silicon micro-electro-mechanical system (MEMS) technique, has been developed. For example, JP-T-2006-515928 discloses a gyro sensor including an excitation system in which two vibrating bodies (movable structures) are connected to each other via a spring, and the vibrating bodies vibrate (also called tuning fork vibration).

In a case where such a gyro sensor is manufactured, a silicon substrate which is provided on a manufacturing base and a silicon structure which is formed by a vibrating body provided with a support spring and a connection spring, are separately prepared using a micro-processing technique such as wet etching. Next, the gyro sensor having the above-described structure may be manufactured by connecting the connection springs to each other.

However, in the above-described MEMS device manufacturing process, it is substantially difficult to manufacture the respective excitation systems in the exactly same shape. In addition, since a chemical or physical process condition cannot be maintained to be uniform at all times, even in a case where a form in which two vibrating bodies (movable structures) are connected to each other via the spring is integrally manufactured, it is substantially difficult to manufacture the respective excitation systems in shapes which are exactly the same as each other and completely symmetric to each other. Therefore, there are cases where a minute dimension error occurs in each vibrating body. When a minute difference caused by the dimension error occurs, a vibration frequency in an excitation mode is separated so as to be added to an opposite phase mode, and thus an undesirable same phase mode is formed in the natural frequency of the two vibrating bodies. Here, the term "opposite phase" indicates that two vibrating bodies move so as to become distant from or close to each other, and the term "same phase" indicates that the two vibrating bodies move in the same direction. If a frequency in an undesirable same phase mode is close to a frequency in an opposite phase mode, there is a concern that the reliability of the gyro sensor may deteriorate.

SUMMARY

An advantage of some aspects of the invention is to provide a gyro sensor capable of suppressing influence of the same phase mode on a vibration mode. In addition, another advantage of some aspects of the invention is to provide an electronic apparatus and a moving object having the above-described gyro sensor.

The invention can be implemented as the following forms or application examples.

Application Example 1

This application example is directed to a gyro sensor including a vibrating body; a first spring structure portion that extends in a direction along a first axis and is connected to the vibrating body; first and second vibrating portions that are disposed in parallel to each other in the direction along the first axis and are excited and vibrated in an opposite phase to each other; and a second spring structure portion that extends in the direction along the first axis and is connected to the first and second vibrating portions, in which a first spring constant $K_1$ of the first spring structure portion is smaller than a second spring constant $K_2$ from a middle point at which a length between both ends of the second spring structure portion is equally divided into two to one end of the second spring structure portion.

According to the gyro sensor of the application example, the first spring constant $K_1$ of the first spring structure portion is smaller than the second spring constant $K_2$ from the middle point at which a length between both ends of the second spring structure portion is equally divided into two to one end of the second spring structure portion. In other words, it is possible to design the gyro sensor in which the vibrating body is supported by the smoother first spring portion (the first spring portion having the first spring constant $K_1$ relatively smaller than the second spring constant $K_2$). According to the gyro sensor, it is possible to prevent influence of the same phase mode on the vibration mode. Therefore, it is possible to provide a gyro sensor whose reliability improves.

In addition, in the description of the present specification, a term "plan view" indicates a "plan view which is viewed from a direction of a normal line of a base face of a base on which the gyro sensor is provided".

Application Example 2

In the gyro sensor according to this application example, the length between both ends of the first spring structure portion may be larger than a length from one end of the second spring structure portion to the middle point.

Application Example 3

In the gyro sensor according to this application example, a width of the first spring structure portion may be smaller than a width of the second spring structure portion.

Application Example 4

In the gyro sensor according to this application example, the first spring structure portion and the second spring structure portion may extend in the direction along the first axis while reciprocating in a direction along a second axis perpendicular to the first axis, and a length of the first spring structure portion in the direction along the second axis may be larger than a length of the second spring structure portion in the direction along the second axis.

Application Example 5

In the gyro sensor according to this application example, the number of times of extension of the first spring structure portion in the direction along the second axis may be larger than a half of the number of times of extension of the second spring structure portion in the direction along the second axis.

Application Example 6

In the gyro sensor according to this application example, the gyro sensor may include an excitation portion that excites the vibrating body; and a detection portion that is provided in the vibrating body.

Application Example 7

In the gyro sensor according to this application example, a ratio γ ($K_2/K_1$), which is a ratio of the second spring constant $K_2$ to the first spring constant $K_1$, may be 2 or more and 4096 or less.

Application Example 8

This application example is directed to an electronic apparatus including the gyro sensor according to the application example described above.

Application Example 9

This application example is directed to a moving object including the gyro sensor according to the application example.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. In addition, the embodiments described below do not unjustly limit the content of the invention recited in the appended claims. Further, it cannot be said that all constituent elements described below are indispensable constituent elements of the invention.

1. Gyro Sensor

Configuration of Gyro Sensor According to Present Embodiment

Figure 1:
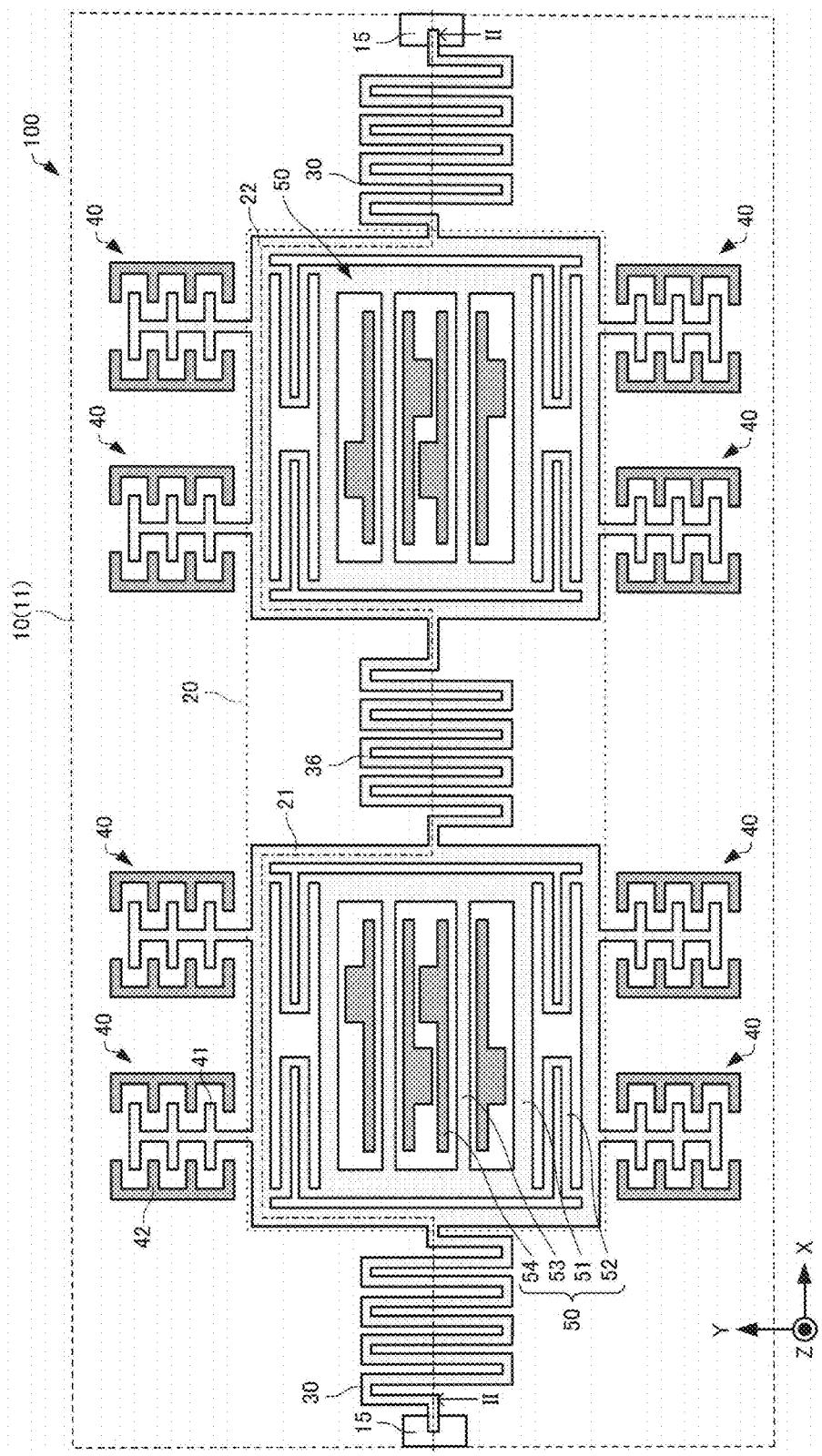
FIG. 1 is a plan view schematically illustrating a gyro sensor according to the present embodiment.
Figure 2:
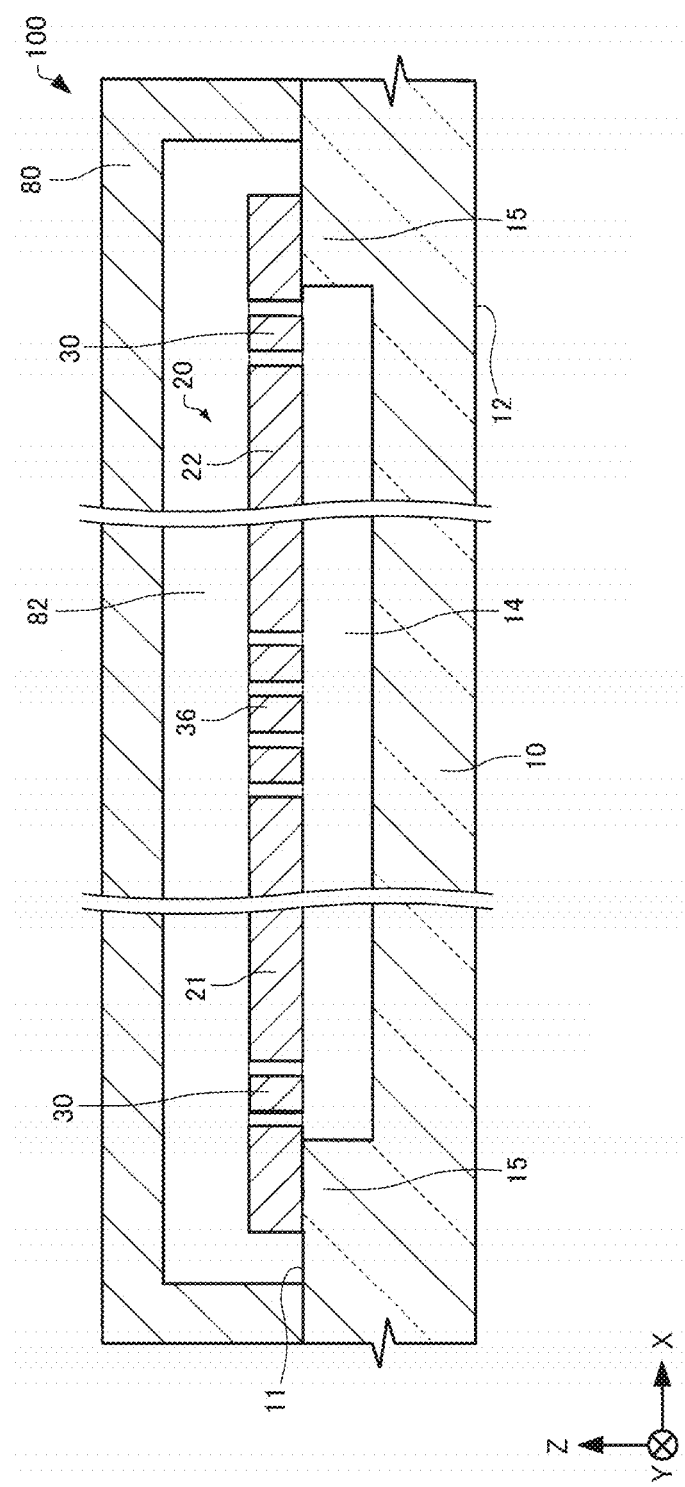
FIG. 2 is a cross-sectional view schematically illustrating the gyro sensor according to the present embodiment.
Figure 3:
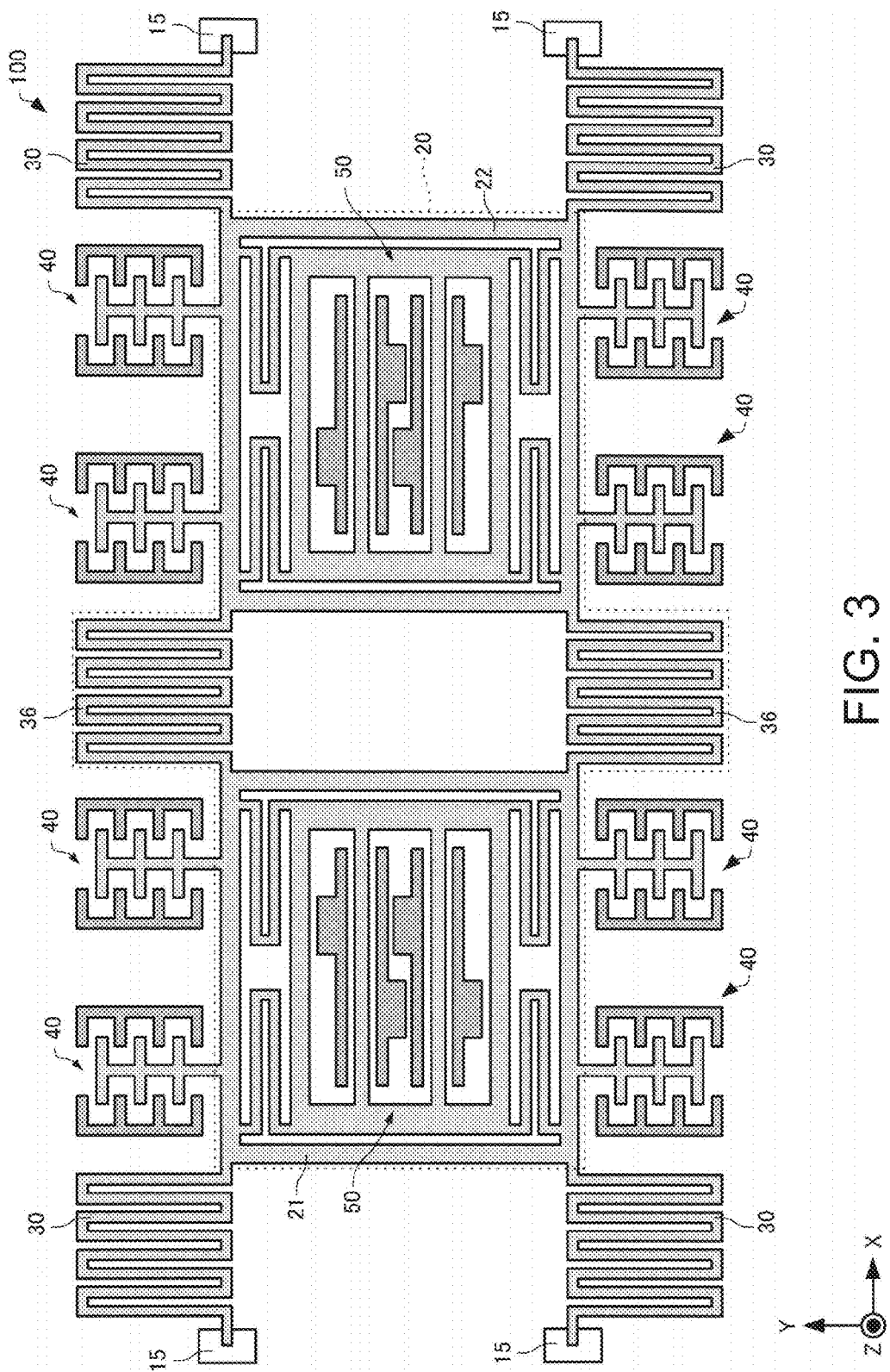
FIG. 3 is a plan view schematically illustrating the gyro sensor according to the present embodiment.

First, a gyro sensor according to the present embodiment will be described with reference to the drawings. FIG. 1 is a plan view schematically illustrating an example of a gyro sensor 100 according to the present embodiment. FIG. 2 is a cross-sectional view taken along the line II-II of FIG. 1 which schematically illustrates the gyro sensor 100 according to the present embodiment. FIG. 3 is a plan view schematically illustrating another example of the gyro sensor 100 according to the present embodiment. In addition, in FIGS. 1 to 3, as three axes perpendicular to each other, an X axis (first axis), a Y axis (second axis), and a Z axis (third axis) are illustrated.

The gyro sensor 100 according to the present embodiment is a device which is manufactured by a micro-electro-mechanical system (MEMS) process. In other words, the gyro sensor 100 is a gyro sensor which is formed from a silicon substrate by using a micro-processing technique such as a semiconductor process.

As illustrated in FIGS. 1 and 2, the gyro sensor 100 may include a base 10, a vibrating body 20, first spring portions 30, a second spring portion 36, excitation portions 40, and detection portions 50. In the gyro sensor 100, the detection portion 50 is a gyro sensor element (a capacitance type MEMS gyro sensor element) which detects angular velocity around the Z axis. In addition, for convenience, in FIG. 1, the base 10 and a lid 80 are depicted transparent in the illustration.

A material of the base 10 is, for example, glass or silicon. As illustrated in FIG. 2, the base 10 has a first face 11 and a second face 12 on a side opposite to the first face 11. A recess 14 is provided in the first face 11. The vibrating body 20, the first spring portions 30, and the second spring portion 36 are provided over the recess 14 via a gap. The vibrating body 20 can move in a desired direction thanks to the recess 14 without hindering by the base 10. A planar shape (a shape when viewed from the Z axis direction) of the recess 14 is not particularly limited, and is a rectangular shape in the example illustrated in FIG. 1. The recess 14 is formed, for example, using a photolithography technique and an etching technique.

The base 10 has a fixing portion 15. As illustrated in FIGS. 1 and 2, the fixing portion 15 is a region which is appropriately provided in the first face 11 in accordance with a form of the vibrating body 20.

The fixing portion 15, to which one end of the first spring portion 30 supporting the vibrating body 20 is fixed (joined), is a portion which supports the vibrating body 20 via the first spring portion 30. As illustrated in FIGS. 1 and 2, the fixing portions 15 may be disposed with the vibrating body 20 interposed therebetween in the X axis direction.

A fixing (joining) method between the first face 11 (the base 10) of the fixing portion 15, and the first spring portion 30, an excitation fixed electrode section 42, a detection fixed electrode section 54, and the like described later is not particularly limited, but, for example, in a case where a material of the base 10 is glass and a material of the vibrating body 20 is silicon, anode joining may be employed.

As illustrated in FIG. 2, the vibrating body 20 is accommodated in a cavity 82 surrounded by the base 10 and the lid 80. The vibrating body 20 is provided over the base 10 via a gap (the recess 14). The vibrating body 20 is supported on the first face 11 (on the base 10) of the base 10 via the first spring portions 30. As illustrated in FIG. 1, the vibrating body 20 includes first and second vibrating portions 21 and 22, and the first and second vibrating portions 21 and 22 are connected to each other via the second spring portion 36.

The first vibrating portion 21 and the second vibrating portion 22 are supported by the fixing portion 15 via the first spring portion 30, and are thus disposed to be separated from the base 10. More specifically, the first vibrating portion 21 and the second vibrating portion 22 are provided over the base 10 via the gap (the recess 14). The first vibrating portion 21 and the second vibrating portion 22 may have, for example, a frame shape (square shape). The first vibrating portion 21 and the second vibrating portion 22 may have a shape which is symmetrical with respect to an axis along the Y axis. The first vibrating portion 21 and the second vibrating portion 22 are disposed in parallel to each other in the direction along the X axis and are connected to each other via the second spring portion 36.

The first spring portion 30 is a support spring portion which supports the vibrating body 20, and is configured to displace the vibrating body 20 in the X axis direction. More specifically, the first spring portion 30 extends in the direction along the X axis from the fixing portion 15 to the vibrating body 20 (the first vibrating portion 21 or the second vibrating portion 22), and has a shape which extends in the X axis direction while reciprocating in the Y axis direction. Specifically, one end of the first spring portion 30 is joined (fixed) to the fixing portion 15 (the first face 11 of the base 10). In addition, the other end of the first spring portion 30 is joined (fixed) to the vibrating body 20 (the first vibrating portion 21 or the second vibrating portion 22). In the example of FIG. 1, two first spring portions 30 are provided with the vibrating body 20 interposed therebetween in the X axis direction. Further, four first spring portions 30 are provided in an example of FIG. 3 described later.

The second spring portion 36 is a connection spring portion which connects the first vibrating portion 21 to the second vibrating portion 22, and is configured to displace the first vibrating portion 21 and the second vibrating portion 22 in the X axis direction. More specifically, the second spring portion 36 extends in the direction along the X axis between the first vibrating portion 21 and the second vibrating portion 22, and has a shape which extends in the X axis direction while reciprocating in the Y axis direction. Accordingly, the first vibrating portion 21 and the second vibrating portion 22 can vibrate in an opposite phase to each other in the X axis direction.

A material of the vibrating body 20 (the first and second vibrating portions 21 and 22), the first spring portions 30, and the second spring portion 36 is silicon which is doped with impurities such as, for example, phosphor and boron, and is thus conductive. The vibrating body 20 (the first and second vibrating portions 21 and 22), the first spring portions 30, and the second spring portion 36 are formed by processing a silicon substrate (not illustrated) by using a photolithography technique and an etching technique. The vibrating body 20 (the first and second vibrating portions 21 and 22), the first spring portions 30, and the second spring portion 36 may be integrally formed from a silicon substrate. In addition, vibrating body 20 (the first and second vibrating portions 21 and 22), the first spring portions 30, and the second spring portion 36 may be formed by forming separate components from a silicon substrate and connecting the components to each other.

Further, in the gyro sensor 100 according to the present embodiment, the number of the first spring portions 30 and the second spring portion 36 to be provided is not limited to the number shown in FIG. 1.

As illustrated in FIG. 3, the gyro sensor 100 may be provided with the two second spring portions 36 which connect the first and second vibrating portions 21 and 22 to each other. In addition, in the illustrated example, the four first spring portions 30 may be provided in the vibrating body 20.

Specifically, the two first spring portions 30 may be provided in the first vibrating portion 21 so as to oppose the central second spring portions 36 in the X axis direction. In addition, the two first spring portions 30 may be provided in the second vibrating portion 22 so as to oppose the central second spring portions 36 in the X axis direction. Accordingly the vibrating body 20 is supported by the four fixing portions 15 via the first spring portions 30.

Further, although not illustrated, three sets of the first spring portions 30 and the second spring portions 36 may be provided in the first vibrating portion 21 and the second vibrating portion 22 so as to oppose each other in the X axis direction.

In addition, a detailed structure of the first spring portion 30 and the second spring portion 36 of the gyro sensor 100 according to the present embodiment will be described later.

The excitation portion 40 includes a mechanism which can excite the first vibrating portion 21 and the second vibrating portion 22 of the vibrating body 20. In addition, a configuration and the number of excitation portions 40 are not particularly limited as long as the first vibrating portion 21 or the second vibrating portion 22 can be excited.

For example, the excitation portion 40 may be directly provided in the vibrating body 20. As illustrated in FIG. 1, the excitation portion 40 may include an excitation movable electrode section 41 connected to the outside of the vibrating body 20, and an excitation fixed electrode section 42 which is disposed so as to face the excitation movable electrode section 41 with a predetermined gap. In addition, although not illustrated, the excitation portion 40 may include a mechanism which excites the vibrating body 20 by using an electrostatic force or the like without being directly connected to the vibrating body 20, and may be disposed outside the vibrating body 20.

The excitation movable electrode section 41 may be connected to the first vibrating portion 21 and the second vibrating portion 22 and may be provided in a plurality. In the illustrated example, the excitation movable electrode section 41 may be a comb-shaped electrode which has a stem extending from the first and second vibrating portions 21 and 22 in the +Y direction (or −Y direction) and a plurality of branches extending from the stem in the +X direction and −X direction.

The excitation fixed electrode section 42 is disposed outside the excitation movable electrode section 41. The excitation fixed electrode section 42 is joined (fixed) to the first face 11 of the base 10. In the illustrated example, the plurality of excitation fixed electrode sections 42 are disposed so as to oppose each other via the excitation movable electrode section 41. In a case where the excitation movable electrode section 41 has a comb shape, a shape of the excitation fixed electrode section 42 may be a comb shape so as to correspond to the excitation movable electrode section 41.

The excitation movable electrode section 41 and the excitation fixed electrode section 42 are electrically connected to a power supply (not illustrated). When a voltage is applied to the excitation movable electrode section 41 and the excitation fixed electrode section 42, an electrostatic force can be generated between the excitation movable electrode section 41 and the excitation fixed electrode section 42. Accordingly, the first spring portion 30 can be expanded and contracted along the X axis, and thus the vibrating body 20 can be vibrated along the X axis.

A material of the excitation portion 40 is silicon which is doped with an impurity such as, for example, phosphor or boron, and is thus conductive. The excitation portion 40 is formed, for example, by integrally processing a silicon substrate (not illustrated) along with the vibrating body 20 by using a photolithography technique and an etching technique.

The detection portion 50 is connected to the vibrating body 20. In the illustrated example, the detection portions 50 are respectively provided inside the first vibrating portion 21 and the second vibrating portion 22. The detection portion 50 may include a detection support section 51, a detection spring section 52, a detection movable electrode section 53, and a detection fixed electrode section 54. In addition, although not illustrated, the detection portion 50 may be disposed outside the first vibrating portion 21 and the second vibrating portion 22 when connected to the vibrating body 20.

A shape of the detection support section 51 is not particularly limited as long as the shape is a ring shape. The detection support section 51 has, for example, a frame shape.

The detection spring section 52 is disposed outside the detection support section 51. The detection spring section 52 connects the detection support section 51 to the vibrating body 20 (the first vibrating portion 21 or the second vibrating portion 22). More specifically, one end of the detection spring section 52 is connected to the detection support section 51. The other end of the detection spring section 52 is connected to the vibrating body 20 (the first vibrating portion 21 or the second vibrating portion 22). The detection spring section 52 is configured to displace the detection support section 51 in the Y axis direction. More specifically, the detection spring section 52 has a shape which extends in the Y axis direction while reciprocating in the X axis direction.

The detection movable electrode section 53 is disposed so as to be connected to the detection support section 51 inside the detection support section 51. In the illustrated example, the detection movable electrode section 53 extends along the X axis.

The detection fixed electrode section 54 is disposed inside the detection support section 51. The detection fixed electrode section 54 is joined (fixed) to the first face 11 of the base 10. In the illustrated example, the plurality of detection fixed electrode sections 54 are provided and are disposed so as to oppose each other via the detection movable electrode section 53.

A material of the detection portion 50 is silicon which is doped with an impurity such as, for example, phosphor or boron, and is thus conductive. The detection portion 50 is formed, for example, by integrally processing a silicon substrate (not illustrated) along with the vibrating body 20 by using a photolithography technique and an etching technique.

The lid 80 is provided on the base 10. As illustrated in FIG. 2, the base 10 and the lid 80 may form a package. The base 10 and the lid 80 may form the cavity 82, and thus the vibrating body 20 may be accommodated in the cavity 82. For example, an adhesive member or the like may be embedded between the base 10 and the lid 80 illustrated in FIG. 2, and, in this case, the cavity 82 may be air-tightly closed, for example, in an inert gas (for example, a nitrogen gas) atmosphere, or a vacuum atmosphere.

A material of the lid 80 is, for example, silicon or glass. A method of joining the lid 80 to the base 10 is not particularly limited, but, in a case where a material of the base 10 is glass and a material of the lid 80 is silicon, the base 10 and the lid 80 may be joined together using anode joining.

Figure 4A:
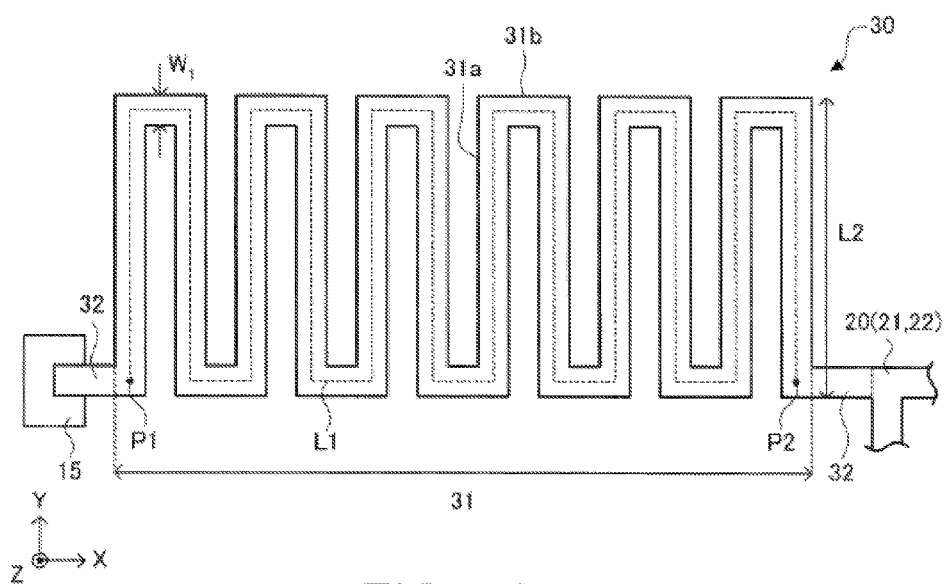
FIGS. 4A and 4B are plan views schematically illustrating main parts of the gyro sensor according to the present embodiment.
Figure 4B:
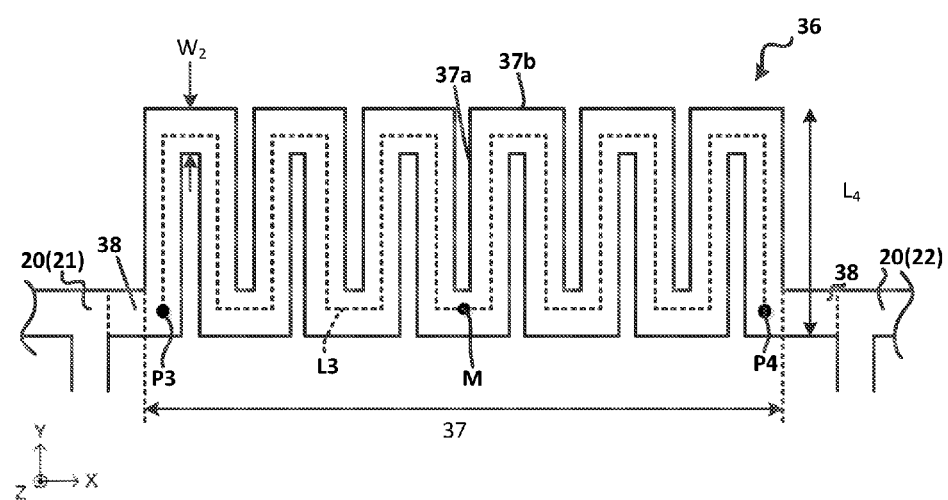

Next, a detailed structure of the first spring portion 30 and the second spring portion 36 of the gyro sensor 100 according to the present embodiment will be described with reference to the drawings. FIGS. 4A and 4B are plan views schematically illustrating the first spring portion 30 and the second spring portion 36.

As illustrated in FIG. 4A, the first spring portion 30 includes a first spring structure section 31 which extends in a direction along the X axis direction, and a first connection section 32 which connects the first spring structure section 31 to both the fixing portion 15 and the vibrating body 20. Specifically, one end of the first spring structure section 31 is fixed to the fixing portion 15 via the first connection section 32, and the other end of the first spring structure section 31 is connected to the vibrating body 20 (the first vibrating portion 21 or the second vibrating portion 22) via the first connection section 32.

The first spring structure section 31 is apart which can be expanded and contracted substantially in the X axis direction in the first spring portion 30, and is a part which forms a spring mechanism. The spring mechanism of the first spring structure section 31 is not particularly limited as long as the mechanism can be formed using a micro-processing technique such as a semiconductor process and can be expanded and contracted in the X axis direction.

As illustrated in FIG. 4A, the first spring structure section 31 may be a folded beam spring structure (folded beam suspension) which extends in the direction along the X axis and has a shape (meandering shape) extending in the X axis direction while reciprocating in the Y axis direction. Specifically, as illustrated in FIG. 4A, the first spring structure section 31 may have a spring structure in which an extension part 31$a$ extending in the Y axis direction and an extension part 31$b$ extending in the X axis direction are alternately continuously located.

Here, a total length of the constituent member of the first spring structure section 31 is set to $L_1$, and a length in the Y axis direction perpendicular to the X axis direction in which the constituent member is expanded and contracted is set to $L_2$. In the form illustrated in FIG. 4A, a total length (a length from a point P1 to a point P2) of the extension part 31$a$ and the extension part 31$b$ is $L_1$, and a length of the extension part 31$a$ extending in the Y axis direction is $L_2$.

In a case where the first spring structure section 31 has the folded beam spring structure illustrated in FIG. 4A, a first spring constant $K_1$ of the first spring structure section 31 may be regarded as a spring constant when a spring constant $k_{cantL2}$ of a cantilever with the length $L_2$ is disposed in series. The spring constant $k_{cantL2}$ of the cantilever formed by a beam with the length $L_2$, the thickness h, and the width w is defined by the following Expression (1). In addition, E in the following Expression (1) indicates a Young's modulus unique to the member.

$$k_{cantL2} = Ehw^3/L_2^3 \qquad (1)$$

When the number of the extension parts 31a included in the first spring structure section 31 is set to $n_1$ ($n_1$=12 in the illustrated example), the first spring constant $K_1$ of the first spring structure section 31 having the folded beam spring structure is defined by the following Expression (2).

$$K_1 = 1/(n_1/k_{cantL2}) = k_{cantL2}/n_1 \qquad (2)$$

Next, as illustrated in FIG. 4B, the second spring portion 36 includes a second spring structure section 37 which extends in a direction along the X axis direction, and a second connection section 38 which connects the second spring structure section 37 to both the first vibrating portion 21 and the second vibrating portion 22. Specifically, one end of the second spring structure section 37 is connected to the first vibrating portion 21 via the second connection section 38, and the other end of the second spring structure section 37 is connected to the second vibrating portion 22 via the second connection section 38.

The second spring structure section 37 is a part which can be expanded and contracted substantially in the X axis direction in the second spring portion 36, and is a part which forms a spring mechanism. The spring mechanism of the second spring structure section 37 is not particularly limited as long as the mechanism can be formed using a microprocessing technique such as a semiconductor process and can be expanded and contracted in the X axis direction.

As illustrated in FIG. 4B, the second spring structure section 37 may be a folded beam spring structure (folded beam suspension) which extends in the direction along the X axis and has a shape (meandering shape) extending in the X axis direction while reciprocating in the Y axis direction. Specifically, as illustrated in FIG. 4B, the second spring structure section 37 may have a spring structure in which an extension part 37a extending in the Y axis direction and an extension part 37b extending in the X axis direction are alternately continuously located.

Here, a total length of the constituent member of the second spring structure section 37 is set to $L_3$, and a length in the Y axis direction perpendicular to the X axis direction in which the constituent member is expanded and contracted is set to $L_4$. In the form illustrated in FIG. 4B, a total length (a length from a point P3 to a point P4) of the extension part 37a and the extension part 37b is $L_3$, and a length of the extension part 37a extending in the Y axis direction is $L_4$.

In addition, as illustrated in FIG. 4B, a point at which the length $L_3$ between both ends (the points P3 and P4) of the second spring structure section 37 is equally divided into two is set to a middle point M. Further, a spring constant from the middle point M at which the length between both ends of the second spring structure section 37 is equally divided into two to one end (the point P3 or P4) of the second spring structure section 37 is set to a second spring constant $K_2$.

In a case where the second spring structure section 37 has the folded beam spring structure illustrated in FIG. 4B, the second spring constant $K_2$ may be regarded as a spring constant when a spring constant $k_{cantL4}$ of a cantilever with the length $L_4$ is disposed in series. The spring constant $k_{cantL4}$ of the cantilever formed by a beam with the length $L_4$, the thickness h, and the width w is defined by the following Expression (3). In addition, E in the following Expression (3) indicates a Young's modulus unique to the member.

$$k_{cantL4} = 2Ehw^3/L_4 \qquad (3)$$

When the number of the extension parts 37a included from the middle point M to one end (P3 or P4) of the second spring structure section 37 is set to $n_2$ ($n_2$=6 in the illustrated example), the second spring constant $K_2$ from the middle point M at which the length between both ends of the second spring structure section 37 is equally divided into two to one end of the second spring structure section 37 is defined by the following Expression (4).

$$K_2 = 1/(n_2/k_{cantL4}) = k_{cantL4}/n_2 \qquad (4)$$

In the gyro sensor 100 according to the present embodiment, the first spring constant $K_1$ of the first spring structure section 31 is smaller than the second spring constant $K_2$ from the middle point M at which the length between both ends of the second spring structure section 37 is equally divided into two to one end (P3 or P4) of the second spring structure section 37. Therefore, the first spring portion 30 and the second spring portion 36 of the gyro sensor 100 are designed so as to satisfy the following Expression (5).

$$K_2 (= k_{cantL4}/n_2) > K_1 (= k_{cantL2}/n_1) \qquad (5)$$

If the first spring constant $K_1$ of the first spring portion 30 is designed so as to be smaller than the second spring constant $K_2$, influence of the same phase mode on a vibration mode can be prevented, and thus it is possible to provide a gyro sensor whose reliability improves. Details thereof will be described later.

A specific design method of the first spring structure section 31 and the second spring structure section 37 for satisfying the above Expression (5) may employ, for example, the following methods.

For example, the length $L_1$ between both ends of the first spring structure section 31 may be designed so as to be larger than the length ($L_3$/2) from one end of the second spring structure section 37 to the middle point M. In other words, the number of times of reciprocating (which is the number of times of extension and is also referred to as the number of turns) of the first spring structure sections 31 in the Y axis direction may be designed so as to be larger than the number of times of reciprocating (which is the number of times of extension and is also referred to as the number of turns) in the Y axis direction from one end of the second spring structure section 37 to the middle point M.

In addition, for example, as illustrated in FIGS. 4A and 4B, when the width of the first spring structure section 31 is set to $W_1$, the width of the second spring structure section 37 is set to $W_2$, the width $W_1$ of the first spring structure section 31 may be designed so as to be smaller than the width $W_2$ of the second spring structure section 37.

Further, for example, a thickness of the first spring structure section 31 may be smaller (not illustrated) than a thickness of the second spring structure section 37. However, in a case where the first spring structure section and the second spring structure section are formed using a microprocessing technique such as a semiconductor process from a silicon substrate with a substantially uniform thickness, it is simpler to make the width $W_1$ of the first spring structure section 31 different from the width $W_2$ of the second spring structure section 37 than to make a thickness of the first spring structure section 31 different from a thickness of the second spring structure section 37. Furthermore, from the above Expressions 1 and 3, it is possible to more effectively increase a ratio of the second spring constant $K_2$ to the first spring constant $K_1$ by changing the width w than changing the thickness h.

In addition, for example, the length $L_2$ (the length of the extension part 31a) of the first spring structure section 31 in the direction along the Y axis may be designed so as to be larger than the length $L_4$ (the length of the extension part 37a) of the second spring structure section 37 in the direction along the Y axis.

Here, the gyro sensor 100 is a device which is manufactured by a MEMS process. In other words, the gyro sensor 100 is a gyro sensor which is formed using a micro-processing technique such as a semiconductor process from a silicon substrate which has the substantially uniform thickness. Therefore, when dimensions of the first spring structure section 31 and the second spring structure section 37 forming the gyro sensor 100 are determined, manufacturing restriction such as a MEMS process condition or a design rule is imposed on sizes of a photomask or a silicon wafer used in the micro-processing technique.

In the gyro sensor 100 according to the present embodiment, a ratio $\gamma$ ($K_2/K_1$) of the second spring constant $K_2$ to the first spring constant $K_1$ may be 2 or more and 4096 or less. Accordingly, it is possible to provide the gyro sensor 100 whose reliability improves in consideration of the manufacturing restriction such as a MEMS process condition or a design rule. Hereinafter, the reason thereof will be described in detail.

In a case where a MEMS gyro sensor (for example, a size of 800×400 µm² to 1000×500 µm²) is designed in consideration of the micro-processing technique, a width may be 4 µm, and a length ($L_2$ and $L_4$) of the extension parts 31a and 37a extending in the Y axis direction may be 100 µm as dimensions of the first spring structure section 31 and the second spring structure section 37. In addition, the number of times of reciprocating (which is the number of times of extension and is also referred to as the number of turns) of the first spring structure section 31 in the Y axis direction and the number of times of reciprocating (which is the number of times of extension and is also referred to as the number of turns) in the Y axis direction from one end of the second spring structure section 37 to the middle point M may be, for example, three. In other words, the number $n_1$ of extension parts 31a included in the first spring structure section 31 and the number $n_2$ of extension parts 37a included from the middle point M to one end (P3 or P4) of the second spring structure section 37 may be, for example, six.

First, a case where a ratio $\gamma$ ($K_2/K_1$) of the second spring constant $K_2$ to the first spring constant $K_1$ is 2 will be described below.

In such a device, in a case where the length $L_1$ between both ends of the first spring structure section 31 is designed so as to be larger than the length ($L_3/2$) from one end of the second spring structure section 37 to the middle point M, the number of times of reciprocating (which is the number of times of extension and is also referred to as the number of turns) in the Y axis direction from one end of the second spring structure section 37 to the middle point M may be three, and the number of times of reciprocating (which is the number of times of extension and is also referred to as the number of turns) of the first spring structure section 31 in the Y axis direction may be a maximum of six, in consideration of rigidity or the like of a silicon material, or a design rule of a package or the like. Accordingly, the number $n_1$ of extension parts 31a included in the first spring structure section 31 may be six to twelve.

In this case, the lengths of the extension parts 31a and 37a extending in the Y axis direction are the same as each other, and the width $W_1$ of the first spring structure section 31 is the same as the width $W_2$ of the second spring structure section 37. Therefore, from the above Expressions 1 to 4, the ratio $\gamma$ ($K_2/K_1$) of the second spring constant $K_2$ to the first spring constant $K_1$ can be made 2.

Next, a case where the ratio $\gamma$ ($K_2/K_1$) of the second spring constant $K_2$ to the first spring constant $K_1$ is 4096 will be described below.

In such a device, first, the width $W_1$ of the first spring structure section 31 may be designed so as to be smaller than the width $W_2$ of the second spring structure section 37. In this case, the width $W_1$ of the first spring structure section 31 may be reduced to 1 µm which is a quarter thereof, in consideration of rigidity or the like of a silicon material, or a design rule of a package or the like.

In a case where the width $W_1$ of the first spring structure section 31 is reduced to 1 µm, a space which can be used in the X axis direction is increased in terms of design of the first spring structure section 31. Therefore, the number of times of reciprocating (which is the number of extensions and is also referred to as the number of turns) of the first spring structure section 31 in the Y axis direction can be made 24 which is four time greater than a maximum of six at the width of 4 µm. Accordingly, the number $n_1$ of extension parts 31a included in the first spring structure section 31 is 48 which is eight times greater than 6.

In addition, in such a device, the length $L_2$ (the length of the extension part 31a) of the first spring structure section 31 in the direction along the Y axis may be designed so as to be larger than the length $L_4$ (the length of the extension part 37a) of the second spring structure section 37 in the direction along the Y axis. The length $L_2$ of the extension part 31a may be made from 100 µm to 200 µm which is maximally twice larger than that in consideration of rigidity or the like of a silicon material, or a design rule of a package or the like.

When the MEMS gyro sensor is designed under the above-described conditions, a maximum value of the ratio $\gamma$ ($K_2/K_1$) of the second spring constant $K_2$ to the first spring constant $K_1$ may be defined as 4096 (=$4^3 \times 8 \times 2^3$) from the above Expressions 1 to 4.

The gyro sensor 100 according to the present embodiment has the following features, for example.

According to the gyro sensor 100, the first spring constant $K_1$ of the first spring structure section 31 is smaller than the second spring constant $K_2$ from the middle point M at which the length between both ends of the second spring structure section 37 is equally divided into two to one end of the second spring structure section 37. In other words, it is possible to design the gyro sensor 100 in which the vibrating body 20 is supported by the smoother first spring portion 30 (the first spring portion 30 having the first spring constant $K_1$ relatively smaller than the second spring constant $K_2$). According to the gyro sensor 100, it is possible to prevent influence of the same phase mode on the vibration mode. Therefore, it is possible to provide a gyro sensor whose reliability improves.

2. Operation of Gyro Sensor

Next, an operation of the gyro sensor 100 will be described with reference to the drawings. FIGS. 5 to 8 are diagrams schematically illustrating an operation of the gyro sensor 100. Here, FIGS. 5 to 8 exemplify an operation of the gyro sensor according to the embodiment of the invention in a form of the gyro sensor 100 as well. In addition, FIGS. 5 to 8 illustrate three axes perpendicular to each other, an X axis, a Y axis, and a Z axis. Further, for convenience, in FIGS. 5 to 8, each configuration of the gyro sensor 100 is simplified and illustrated.

As described above, in a vibration mode of the gyro sensor 100, the first vibrating portion 21 and the second vibrating portion 22 may be excited by the excitation portion 40 so as to be excited and vibrated in an opposite phase to each other. More specifically, a first alternating voltage is applied between the excitation movable electrode section 41 and the excitation fixed electrode section 42 provided in the first vibrating portion 21, and a second alternating voltage whose phase is shifted by 180 degrees from the first alternating voltage is applied between the excitation movable electrode section 41 and the excitation fixed electrode section 42 of the second vibrating portion 22. Accordingly, the first vibrating portion 21 and the second vibrating portion 22 can be vibrated along the X axis in an opposite phase to each other at a predetermined frequency. That is, the first vibrating portion 21 and the second vibrating portion 22 connected to each other along the X axis are vibrated in an opposite phase to each other along the X axis. In other words, the first vibrating portion 21 and the second vibrating portion 22 are displaced in an opposite direction to each other along the X axis.

Figure 5:
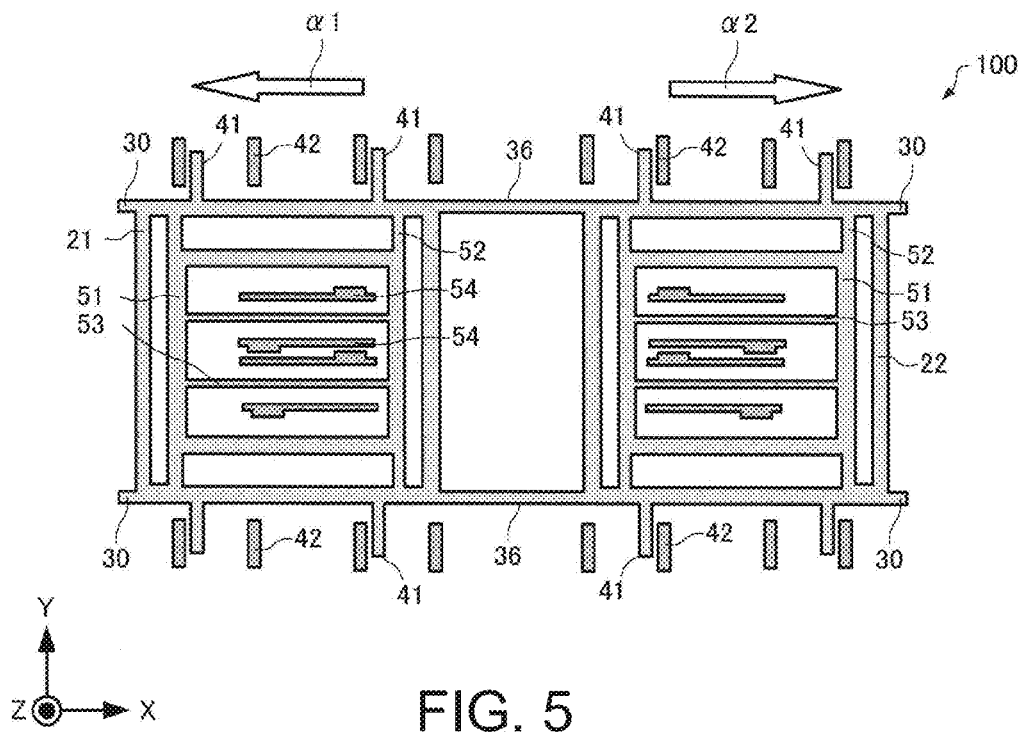
FIG. 5 is a plan view illustrating an operation of the gyro sensor according to the present embodiment.
Figure 6:
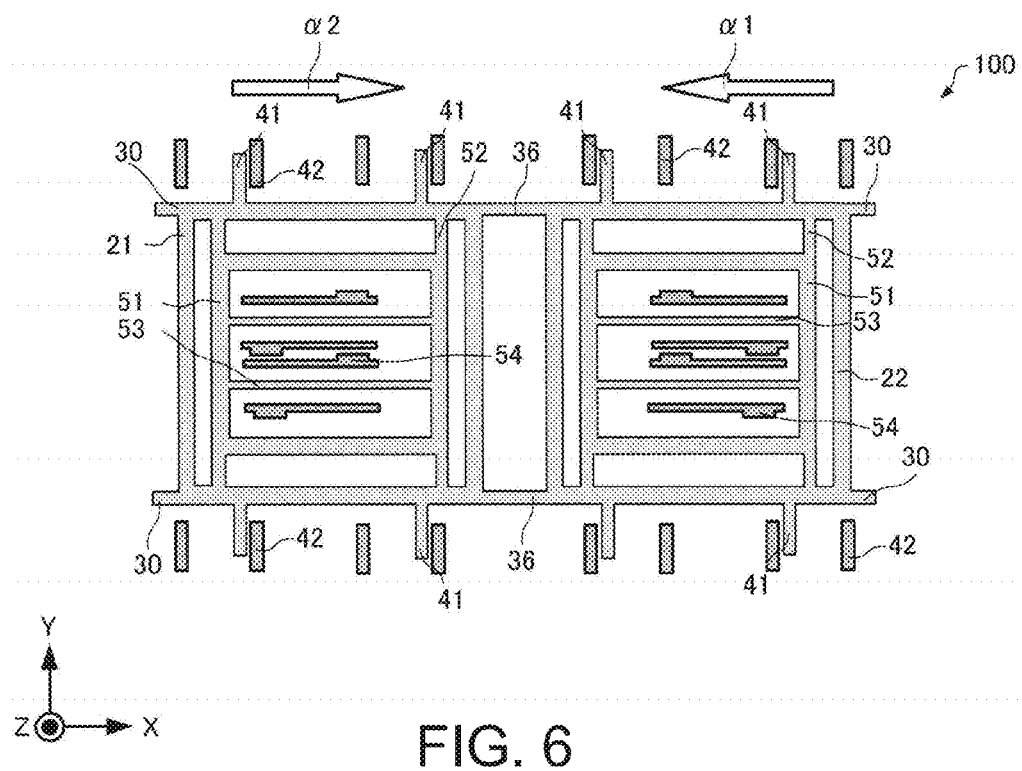
FIG. 6 is a plan view illustrating an operation of the gyro sensor according to the present embodiment.

In the example illustrated in FIG. 5, the first vibrating portion 21 is displaced in an α1 direction (the −X axis direction), and the second vibrating portion 22 is displaced in an α2 direction (the +X axis direction) opposite the α1 direction. In the example illustrated in FIG. 6, the first vibrating portion 21 is displaced in the α2 direction, and the second vibrating portion 22 is displaced in the α1 direction.

In addition, the part of the detection portion 50 connected to the vibrating body 20 (the first vibrating portion 21 and the second vibrating portion 22) is displaced along the X axis along with the vibration of the vibrating body 20 (the first vibrating portion 21 and the second vibrating portion 22).

Figure 7:
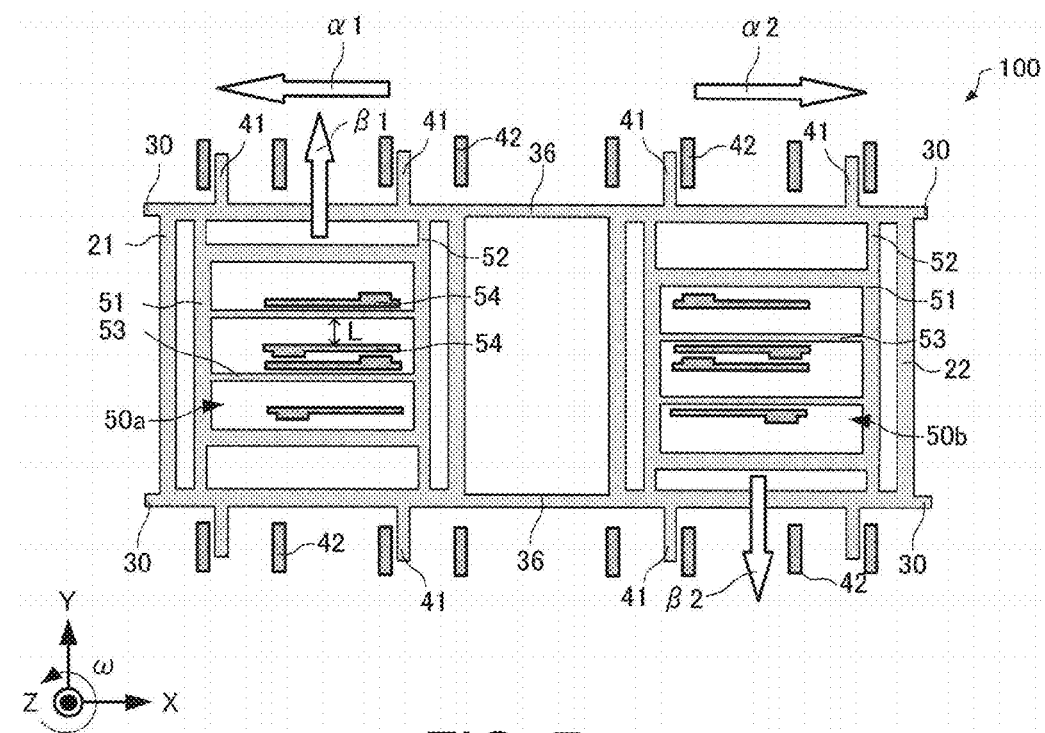
FIG. 7 is a plan view illustrating an operation of the gyro sensor according to the present embodiment.
Figure 8:
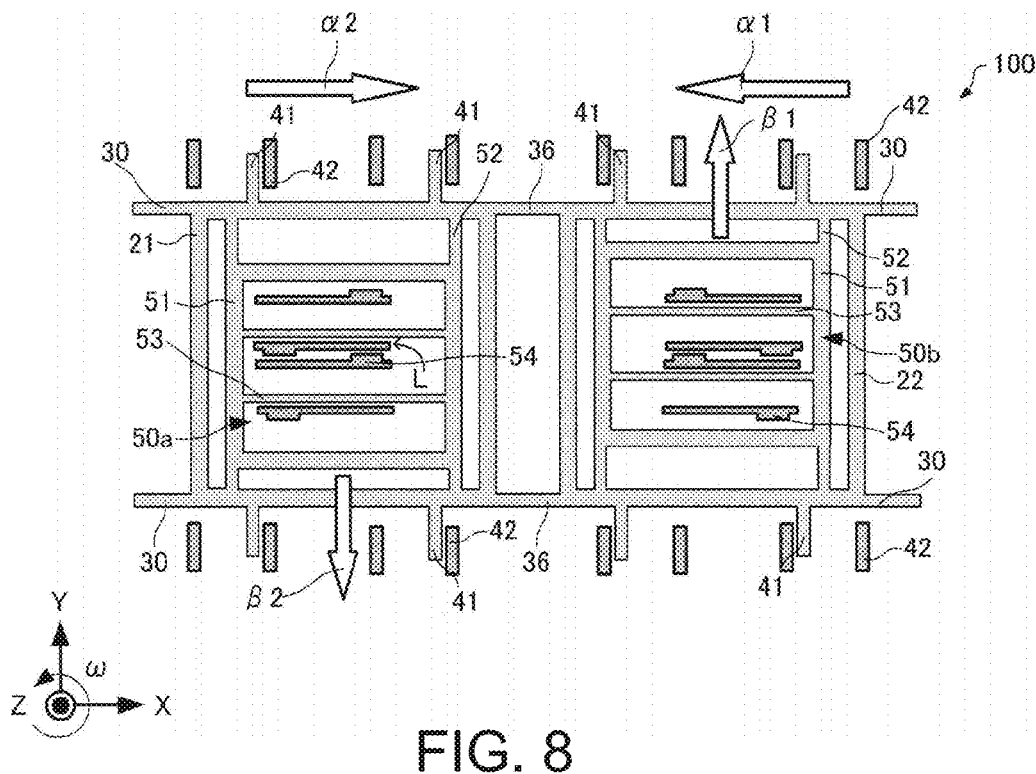
FIG. 8 is a plan view illustrating an operation of the gyro sensor according to the present embodiment.

As illustrated in FIGS. 7 and 8, when angular velocity ω around the Z axis is applied to the gyro sensor 100 in a state in which the first vibrating portion 21 and the second vibrating portion 22 are vibrated along the X axis, a Coriolis' force acts thereon, and thus the detection portion 50 is displaced along the Y axis. In other words, a first detection portion 50a connected to the first vibrating portion 21 and a second detection portion 50b connected to the second vibrating portion 22 are displaced in an opposite direction to each other along the Y axis. In the example illustrated in FIG. 7, the first detection portion 50a is displaced in a β1 direction, and the second detection portion 50b is displaced in a β2 direction opposite to the β1 direction. In the example illustrated in FIG. 8, the first detection portion 50a is displaced in the β2 direction, and the second detection portion 50b is displaced in the β1 direction.

The detection portions 50a and 50b are displaced along the Y axis, and thus a length L between the detection movable electrode section 53 and the detection fixed electrode section 54 is changed. For this reason, a capacitance between the detection movable electrode section 53 and the detection fixed electrode section 54 is changed. In the gyro sensor 100, a voltage is applied to the detection movable electrode section 53 and the detection fixed electrode section 54 so as to detect a change amount of the capacitance between the detection movable electrode section 53 and the detection fixed electrode section 54, thereby obtaining the angular velocity ω around the Z axis.

According to the gyro sensor 100, it is possible to reduce influence of the same phase mode on the vibration mode. Accordingly, the gyro sensor can achieve a desired vibration frequency, and thus it is possible to improve reliability of the gyro sensor. Details thereof will be described later.

3. Example

Next, a simulation result related to Example will be described. In the simulation, a vibration frequency was calculated using a finite element method. A model including an excitation system in which the four first spring portions 30 and the two second spring portions 36 are provided and the vibrating body 20 performs tuning fork vibration as in the form of the gyro sensor 100 related to FIG. 3 was employed as a base model of the simulation related to this Example. As physical property conditions of the constituent members, a Young's modulus was 130.18 GPa, and a cross-section was 50 µm².

As dimensions of the first spring portion 30 and the second spring portion 36, each of the widths $W_1$ and $W_2$ was 4 µm, and each of the lengths ($L_2$ and $L_4$) of the extension parts 31a and 37a extending in the Y axis direction was 100 µm. In addition, each member such as the spring portion of an actual gyro sensor has a variation (error) in shapes (dimensions) which inevitably occurs in a manufacturing process. Therefore, in this Example, a dimension error of 0.17 µm was provided between the first spring portion 30 connected to the first vibrating portion 21 and the first spring portion 30 connected to the second vibrating portion 22.

Comparative Example

In a comparative example, under the above-described conditions, a condition was set in which the first spring constant $K_1$ of the first spring structure section 31 is the same as the second spring constant $K_2$ from the middle point M at which the length between both ends of the second spring structure section 37 is equally divided into two to one end of the second spring structure section 37, and a simulation for measuring frequencies in the same phase mode and an opposite phase mode was performed. Specifically, each of the first spring portions 30 has a form of three turns (three repetitions), and each of the second spring portions 36 has a form of six turns (three repetitions from the middle point M at which the length between both ends of the second spring structure section 37 is equally divided into two to one end of the second spring structure section 37).

Figure 9:
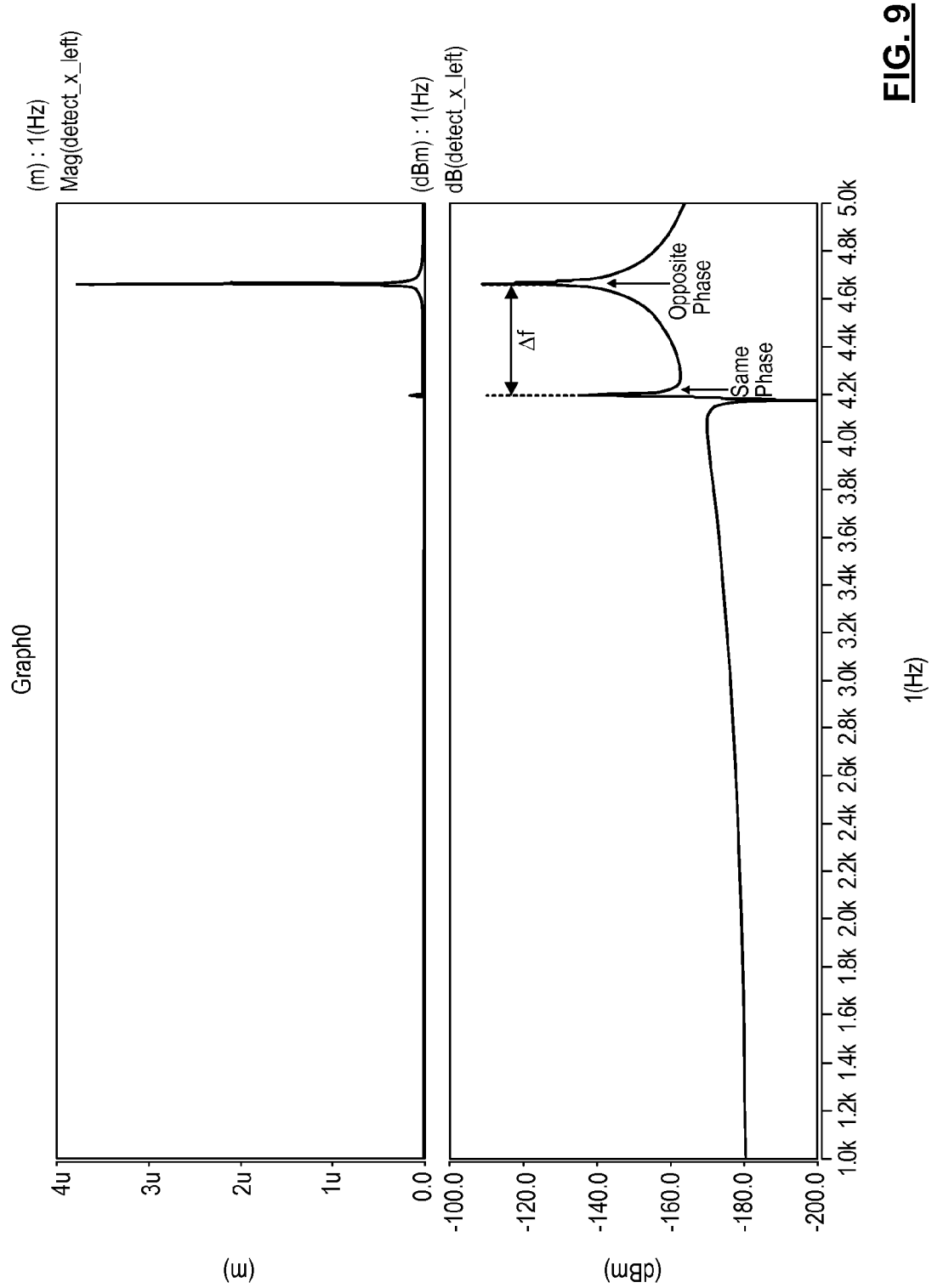
FIG. 9 is a diagram illustrating a simulation result related to a comparative example.

FIG. 9 is a diagram illustrating a simulation result related to the comparative example. The transverse axis expresses a frequency (Hz), and the longitudinal axis expresses a displacement amount (dBm). A scale of the longitudinal axis of the upper figure of FIG. 9 is an absolute value scale, and a scale of the longitudinal axis of the lower figure thereof is a logarithmic scale obtained through logarithmic conversion of a displacement amount. As illustrated in FIG. 9, a difference Δf between frequencies in the same phase mode and an opposite phase mode in the comparative example was 0.47 kHz.

Example

In Example, a condition was set in which the first spring constant $K_1$ of the first spring structure section 31 is smaller than the second spring constant $K_2$ from the middle point M at which the length between both ends of the second spring structure section 37 is equally divided into two to one end of the second spring structure section 37, and a simulation for measuring frequencies in the same phase mode and an opposite phase mode was performed. Specifically, each of the first spring portions 30 has a form of six turns (six repetitions), and each of the second spring portions 36 has a form of six turns (three repetitions from the middle point M at which the length between both ends of the second spring structure section 37 is equally divided into two to one end of the second spring structure section 37). Therefore, a simulation related to Example was performed in a condition in which the ratio γ ($K_2/K_1$) of the second spring constant $K_2$ to the first spring constant $K_1$ is 2.

Figure 10:
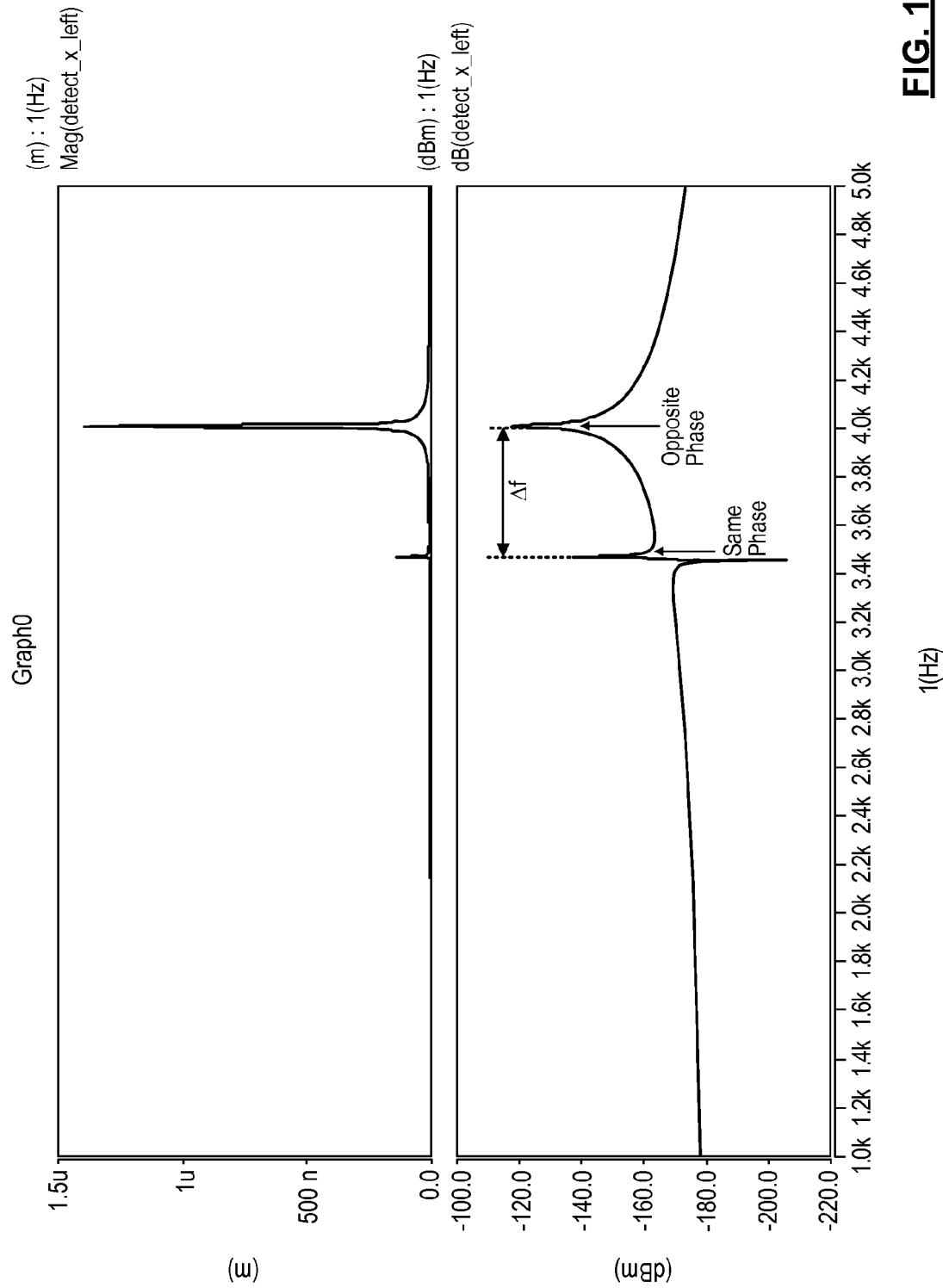
FIG. 10 is a diagram illustrating a simulation result related to the comparative example.

FIG. 10 is a diagram illustrating a simulation result related to Example. The transverse axis expresses a frequency (Hz), and the longitudinal axis expresses a displacement amount (dBm). A scale of the longitudinal axis of the upper figure of FIG. 10 is an absolute value scale, and a scale of the longitudinal axis of the lower figure thereof is a logarithmic scale obtained through logarithmic conversion of a displacement amount. As illustrated in FIG. 10, a difference Δf between frequencies in the same phase mode and an opposite phase mode in Example was 0.55 kHz.

From FIGS. 9 and 10, in Example, compared to the comparative example, the first spring constant $K_1$ of the first spring structure section 31 is made smaller than the second spring constant $K_2$ from the middle point M at which the length between both ends of the second spring structure section 37 is equally divided into two to one end of the second spring structure section 37, and thus a difference Δf between frequencies in the same phase mode and an opposite phase mode can be further separated from each other by 0.08 kHz. In other words, the frequency in the same phase mode can be separated from the frequency in the opposite phase mode. Therefore, it was confirmed that influence of the same phase mode on the vibration mode of the excitation system can be prevented.

4. Manufacturing Method of Gyro Sensor

Figure 11:
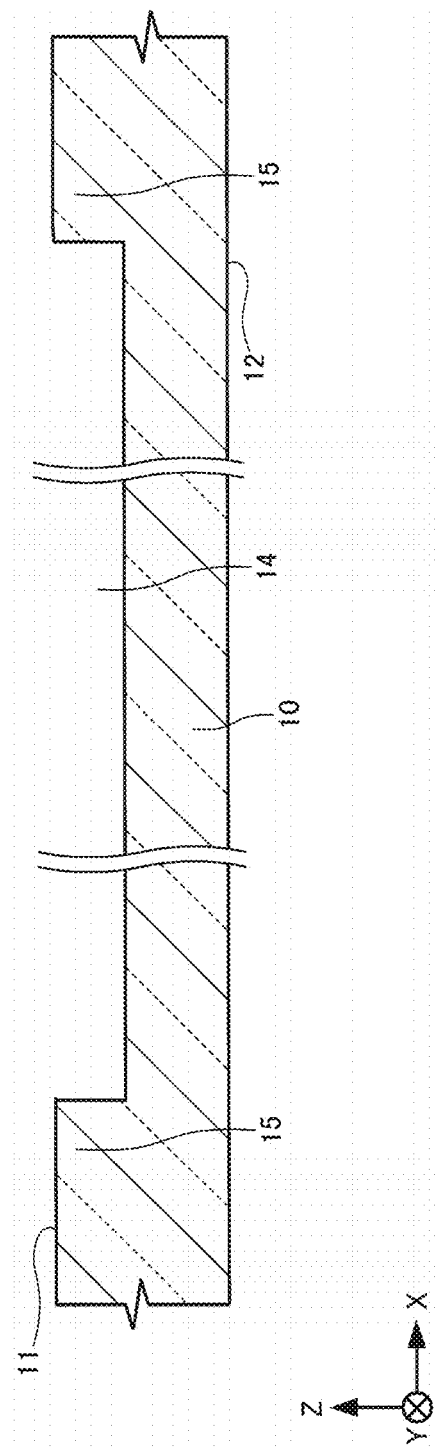
FIG. 11 is a cross-sectional view schematically illustrating a manufacturing step of the gyro sensor according to the present embodiment.
Figure 12:
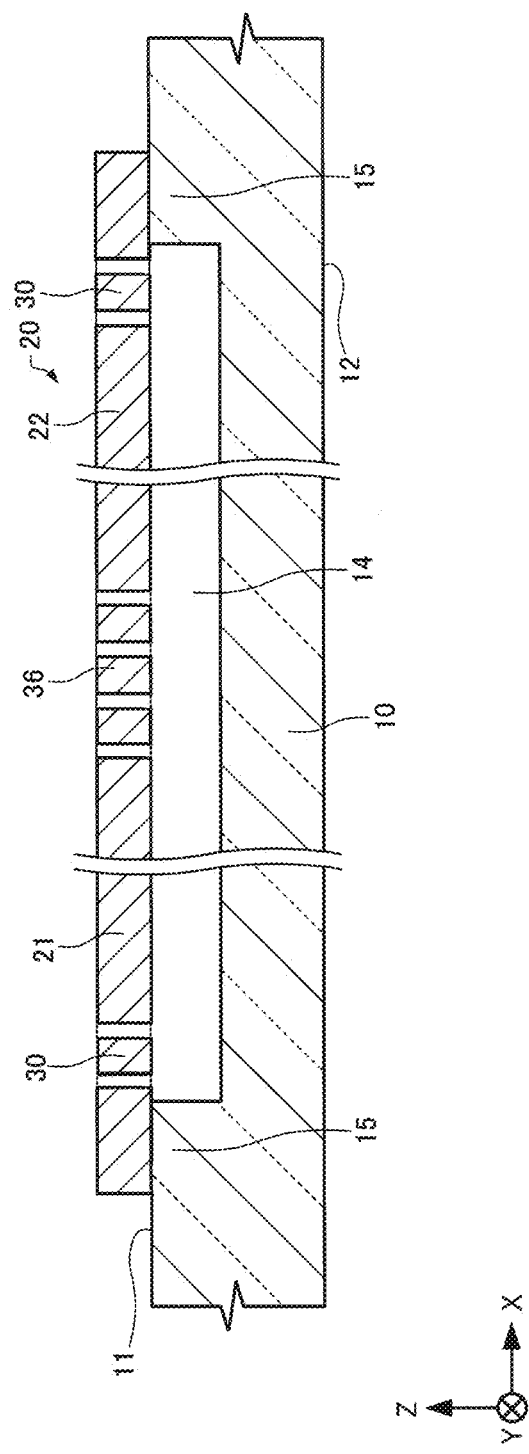
FIG. 12 is a cross-sectional view schematically illustrating a manufacturing step of the gyro sensor according to the present embodiment.

Next, a manufacturing method of the gyro sensor according to the present embodiment will be described with reference to the drawings. FIGS. 11 and 12 are cross-sectional views schematically illustrating manufacturing steps of the gyro sensor 100 according to the present embodiment, and correspond to FIG. 2.

As illustrated in FIG. 11, the recess 14 is formed in the first face 11 of the base 10. At this time, a groove (not illustrated) may be formed around the recess 14. The recess 14 and the groove are formed, for example, using a photolithography technique and an etching technique. Accordingly, the base 10 provided with the recess 14 in the first face 11 can be prepared.

Next, although not illustrated, wirings for forming the excitation portion 40 or the detection portion 50 may be formed on the base 10 including the inside of the recess 14. A film is formed, for example, in a sputtering method, a chemical vapor deposition (CVD) method, or the like, and is patterned using a photolithography technique and an etching technique, thereby forming the wirings.

As illustrated in FIG. 12, the vibrating body 20, the first spring portion 30, and the like are formed on the base 10. More specifically, a silicon substrate (not illustrated) is placed on (joined to) the first face 11 of the base 10, and the silicon substrate is thinned and patterned, thereby forming the vibrating body 20, the first spring portion 30, and the like. The patterning is performed using a photolithography technique and an etching technique. The joining between the silicon substrate and the base 10 is performed using, for example, anode joining.

In this step, the excitation fixed electrode section 42, the detection fixed electrode section 54, and the like may be formed on the first face 11, thereby forming the excitation portion 40 and the detection portion 50.

As illustrated in FIG. 2, the base 10 is joined to the lid 80, and the vibrating body 20 is accommodated in the cavity 82 surrounded by the base 10 and the lid 80. The joining between the base 10 and the lid 80 is performed, for example, using anode joining.

The gyro sensor 100 can be manufactured due to the above-described steps.

5. Electronic Apparatuses

Next, electronic apparatuses according to the present embodiment will be described with reference to the drawings. The electronic apparatuses according to the present embodiment include the gyro sensor according to the embodiment of the invention. Hereinafter, electronic apparatuses including the gyro sensor 100 as a gyro sensor according to the embodiment of the invention will be described.

Figure 13:
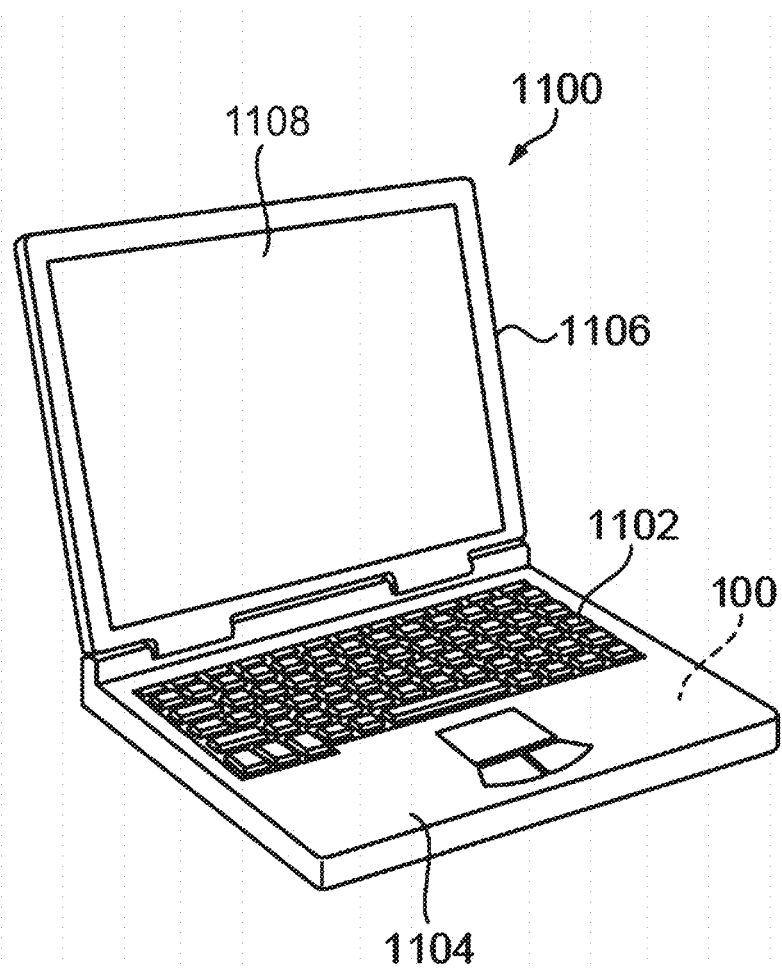
FIG. 13 is a perspective view schematically illustrating an electronic apparatus.

FIG. 13 is a perspective view schematically illustrating a mobile type (or a notebook type) personal computer 1100 as an electronic apparatus according to the present embodiment.

As illustrated in FIG. 13, the personal computer 1100 is constituted by a main body portion 1104 having a keyboard 1102 and a display unit 1106 having a display portion 1108, and the display unit 1106 is supported so as to be rotatably moved with respect to the main body portion 1104 via a hinge structure portion.

The personal computer 1100 includes the gyro sensor 100 built therein.

Figure 14:
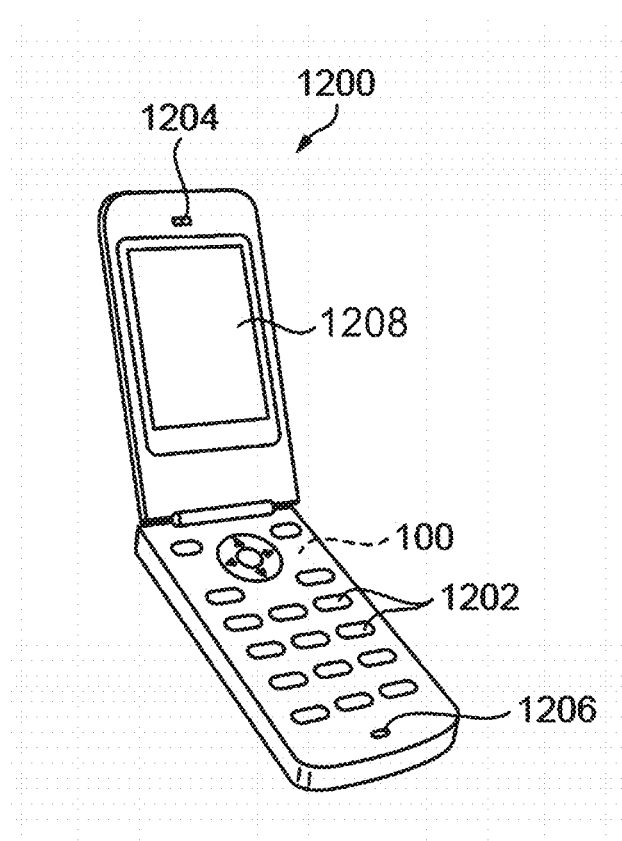
FIG. 14 is a perspective view schematically illustrating an electronic apparatus.

FIG. 14 is a perspective view schematically illustrating a mobile phone (including PHS) 1200 as an electronic apparatus according to the present embodiment.

As illustrated in FIG. 14, the mobile phone 1200 includes a plurality of operation buttons 1202, an earpiece 1204, and a mouthpiece 1206, and a display portion 1208 is disposed between the operation buttons 1202 and the earpiece 1204.

The mobile phone 1200 includes the gyro sensor 100 built therein.

Figure 15:
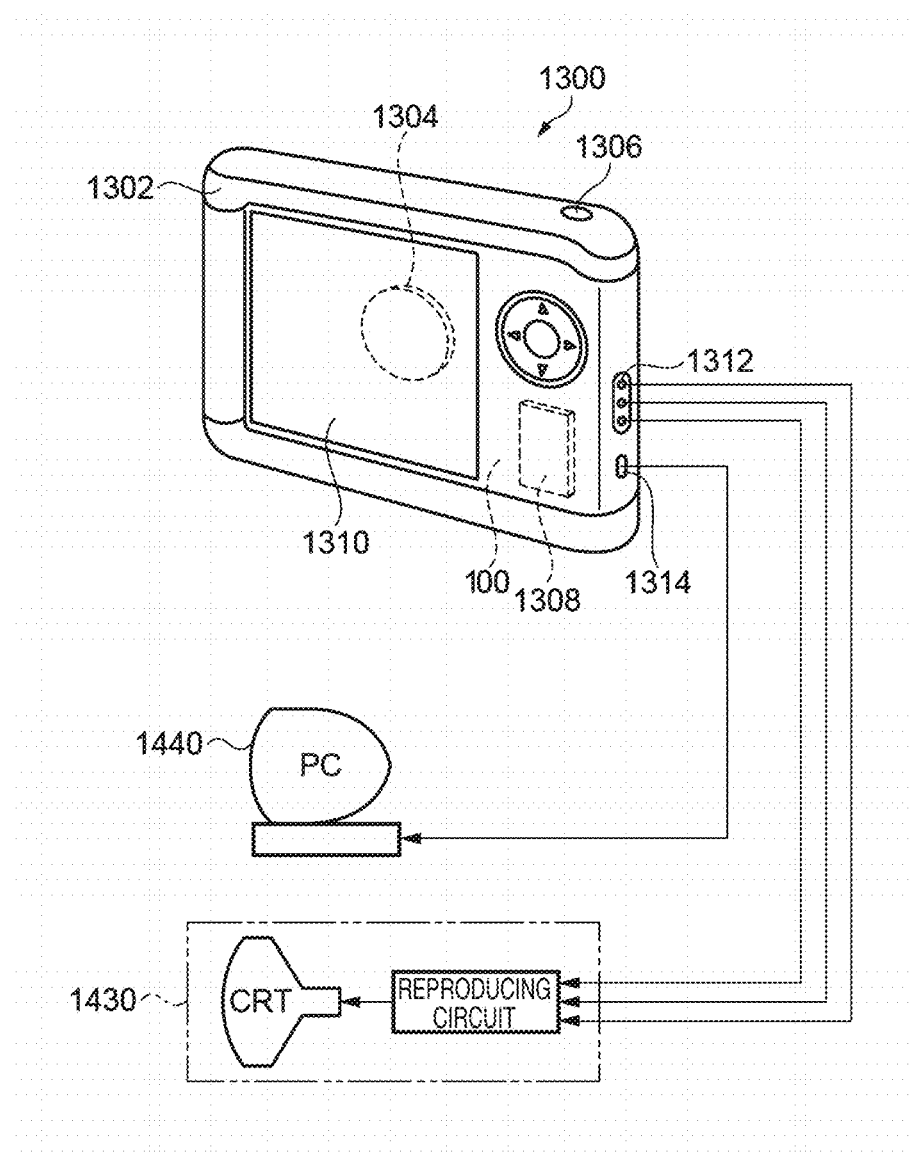
FIG. 15 is a perspective view schematically illustrating an electronic apparatus.

FIG. 15 is a perspective view schematically illustrating a digital still camera 1300 as an electronic apparatus according to the present embodiment. In addition, in FIG. 15, connection to an external apparatus is also briefly illustrated.

Here, a typical camera exposes a silver halide photography film to light using a light image of a subject, whereas the digital still camera 1300 performs photoelectric conversion on a light image of a subject by using an imaging device such as a charge coupled device (CCD) so as to generate an imaging signal (image signal).

A display portion 1310 is provided on a rear side of a case (body) 1302 of the digital still camera 1300 and performs display on the basis of an imaging signal generated by the CCD, and the display portion 1310 functions as a viewfinder which displays a subject as an electronic image.

In addition, alight sensing unit 1304 which includes an optical lens (imaging optical system), a CCD, and the like is provided on a front side (the rear side in FIG. 15) of the case 1302.

When a photographer confirms a subject image displayed on the display portion 1310 and presses a shutter button 1306, an imaging signal of the CCD at this point is transmitted to and stored in a memory 1308.

In addition, in this digital still camera 1300, video signal output terminals 1312 and input and output terminals 1314 for data communication are provided on a side surface of the case 1302. Further, the video signal output terminals 1312 are connected to a television monitor 1430 and the input and output terminals 1314 for data communication are connected to a personal computer 1440 as necessary. Furthermore, an imaging signal stored in the memory 1308 is output to the television monitor 1430 or the personal computer 1440 through a predetermined operation.

The digital still camera 1300 includes the gyro sensor 100 built therein.

The above-described electronic apparatuses 1100, 1200 and 1300 may include the gyro sensor 100 whose reliability improves in an excitation system in which two vibrating bodies are vibrated in an opposite phase.

Further, the electronic apparatus including the gyro sensor 100 is applicable to, for example, an ink jet type ejection apparatus (for example, an ink jet printer), a laptop type personal computer, a television, a video camera, a head mounted display, a video tape recorder, various navigation apparatuses, a pager, an electronic organizer (including a communication function), an electronic dictionary, an electronic calculator, an electronic gaming machine, a wordprocessor, a workstation, a videophone, a security television monitor, an electronic binocular, a POS terminal, a medical apparatus (for example, an electronic thermometer, a sphygmomanometer, a blood glucose monitoring system, an electrocardiographic apparatus, an ultrasonic diagnostic apparatus, or an electronic endoscope), a fish-finder, various measurement apparatuses, meters and gauges (for example, meters and gauges of vehicles, aircrafts, rockets, and ships), posture control of a robot, a human body, or the like, a flight simulator, and the like, in addition to the personal computer (a mobile type personal computer) illustrated in FIG. 13, the mobile phone illustrated in FIG. 14, and the digital still camera illustrated in FIG. 15.

6. Moving Object

Figure 16:
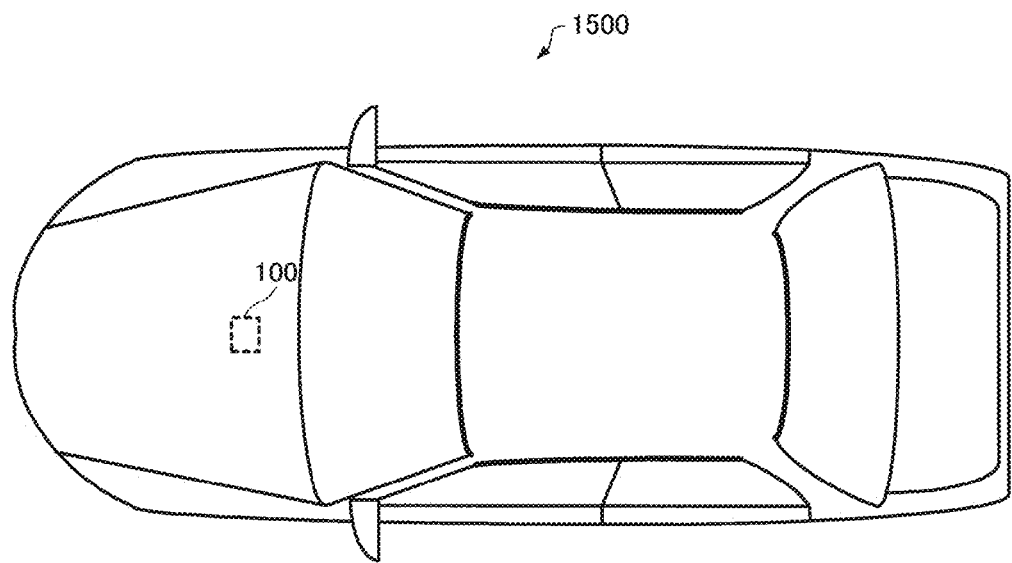
FIG. 16 is a top view schematically illustrating a moving object.

FIG. 16 is a diagram (top view) illustrating an example of a moving object according to the present embodiment. A moving object 1500 illustrated in FIG. 16 include the gyro sensor 100 according to the present embodiment. In addition, the moving object of the present embodiment may have a configuration in which some of constituent elements (respective portions) of FIG. 16 may be omitted or changed, and other constituent elements are added.

In the moving object 1500, a gyro sensor is mounted in a navigation system and the like, and is required to have high reliability in order to perform control necessary in traveling of the moving object.

The gyro sensor 100 according to the present embodiment of the invention is employed as a gyro sensor for a moving object, and thus it is possible to ensure high reliability.

Various moving bodies are considered as such a moving object 1500, and include, for example, automobiles (including electric cars), aircrafts such as a jet plane and a helicopter, ships, rockets, satellites, and the like.

The above-described embodiment and modification examples are only an example, and the invention is not limited thereto. For example, the respective embodiments and respective modification examples may be appropriately combined together.

The invention includes the substantially same configuration (for example, a configuration in which a function, a method, and a result are the same, or a configuration in which an object and an effect are the same) as the configuration described in the embodiment. In addition, the invention includes a configuration in which an unessential part of the configuration described in the embodiment is replaced. Further, the invention includes a configuration which achieves the same operation and effect or can achieve the same object as the configuration described in the embodiment. Furthermore, the invention includes a configuration in which a well-known technique is added to the configuration described in the embodiment.

The entire disclosure of Japanese Patent Application No. 2013-042165, filed Mar. 4, 2013 is expressly incorporated by reference herein.

What is claimed is:

1. A gyro sensor comprising:
   a vibrating body;
   a plurality of first spring structure portions that extend in a direction along a first axis and are connected to the vibrating body, wherein one of the plurality of first spring structure portions is connected on a first side of the vibrating body and another of the plurality of first spring structure portions is connected on a second side of the vibrating body opposite the first side of the vibrating body;
   first and second vibrating portions that are disposed in parallel to each other in the direction along the first axis and are excited and vibrated in an opposite phase to each other; and
   at least one second spring structure portion that extends in the direction along the first axis and is connected to the first and second vibrating portions, wherein the first and second vibrating portions are supported only by the plurality of first spring structure portions and the at least one second spring structure portion connecting the first and second vibrating portions,
   wherein a first spring constant $K_1$ of one of the plurality of first spring structure portions is smaller than a second spring constant $K_2$ from a middle point at which a length between both ends of one of the at least one second spring structure portion is equally divided into two to one end of the one of the at least one second spring structure portion,
   wherein the one of the at least one second spring structure is a single continuous spring extending between the first and second vibrating portions, a first end of the one of the at least one second spring structure attaches to the first vibrating portion and a second end of the one of the at least one second spring structure attaches to the second vibrating portion, and
   wherein the vibrating body is fixed to a base, and wherein the plurality of first spring portions, the at least one second spring portion, the first vibrating portion, and the second vibrating portion extend over a recess in the base, and
   wherein a ratio $\gamma = K_2/K_1$, which is a ratio of the second spring constant $K_2$ to the first spring constant $K_1$, is 2 or more and 4096 or less.

2. The gyro sensor according to claim 1,
   wherein a length between both ends of one of the plurality of first spring structure portions is larger than a length from one end of the at least one second spring structure portion to the middle point of the at least one second spring structure portion.

3. The gyro sensor according to claim 1,
   wherein a width of each of the plurality of first spring structure portions is smaller than a width of the at least one second spring structure portion.

4. The gyro sensor according to claim 1,
   wherein each of the plurality of first spring structure portions and the at least one second spring structure portion extend in the direction along the first axis while reciprocating in a direction along a second axis perpendicular to the first axis, and
   wherein a length of each of the plurality of first spring structure portions in the direction along the second axis is larger than a length of the at least one second spring structure portion in the direction along the second axis.

5. The gyro sensor according to claim 4,
wherein the number of times of extension of each of the plurality of first spring structure portions in the direction along the second axis is larger than a half of the number of times of extension of the at least one second spring structure portion in the direction along the second axis.

6. The gyro sensor according to claim 1, further comprising:
an excitation portion that excites the vibrating body; and
a detection portion that is provided in the vibrating body.

* * * * *